(12) United States Patent
Mori

(10) Patent No.: US 10,683,892 B2
(45) Date of Patent: Jun. 16, 2020

(54) BEARING UNIT STRUCTURE AND MANUFACTURING METHOD THEREOF

(71) Applicant: Suzuki Motor Corporation, Hamamatsu-shi, Shizuoka-ken (JP)

(72) Inventor: Masaki Mori, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 16/125,103

(22) Filed: Sep. 7, 2018

(65) Prior Publication Data

US 2019/0078615 A1   Mar. 14, 2019

(30) Foreign Application Priority Data

Sep. 11, 2017 (JP) ................................ 2017-173734

(51) Int. Cl.
| | | |
|---|---|---|
| F16C 19/52 | (2006.01) | |
| F16C 27/06 | (2006.01) | |
| F16C 25/08 | (2006.01) | |
| F02F 7/00 | (2006.01) | |
| F16C 35/077 | (2006.01) | |

(52) U.S. Cl.
CPC .......... *F16C 27/066* (2013.01); *F02F 7/0043* (2013.01); *F02F 7/0053* (2013.01); *F16C 25/08* (2013.01); *F16C 35/077* (2013.01); *F16C 2202/22* (2013.01); *F16C 2220/02* (2013.01); *F16C 2220/04* (2013.01); *F16C 2360/22* (2013.01)

(58) Field of Classification Search
CPC .... F16C 19/525; F16C 27/066; F16C 35/077; F16C 2360/22
See application file for complete search history.

(56) References Cited

U.S. PATENT DOCUMENTS

| | | | | |
|---|---|---|---|---|
| 5,304,594 A | * | 4/1994 | Saitou | C08L 67/02 524/401 |
| 5,598,747 A | | 2/1997 | Schetter et al. | |
| 9,140,298 B2 | * | 9/2015 | Stoinski | F16C 35/077 |
| 2015/0055907 A1 | * | 2/2015 | Evans | F16C 25/08 384/569 |

FOREIGN PATENT DOCUMENTS

| | | | |
|---|---|---|---|
| CN | 201080968 Y | 7/2008 | |
| GB | 1497151 A * | 1/1978 | ............ F16C 35/077 |
| JP | H06109025 A | 4/1994 | |

* cited by examiner

*Primary Examiner* — Phillip A Johnson
(74) *Attorney, Agent, or Firm* — Barnes & Thornburg LLP

(57) ABSTRACT

A bearing unit structure includes a bearing and a bearing holding unit. The bearing rotatably supports a drive shaft. The bearing holding unit is provided to a crankcase so as to hold the bearing. A groove portion is formed on an inner peripheral surface α of the bearing holding unit, and the inner peripheral surface α faces the bearing. A thermal expansion correction band made of a resin is integrally formed with the bearing holding unit in a state of being embedded into the groove portion.

15 Claims, 6 Drawing Sheets

BEARING UNIT STRUCTURE AND MANUFACTURING METHOD THEREOF

CROSS-REFERENCE TO RELATED APPLICATIONS

This application claims the benefit of priority of Japanese Patent Application No. 2017-173734, filed Sep. 11, 2017, the entire contents of which are incorporated herein by reference.

BACKGROUND OF THE INVENTION

Field of the Invention

The present invention relates to a bearing unit structure where a bearing member holding unit of a case member holds a bearing member, and to a method for manufacturing the bearing unit structure.

Description of the Related Art

Patent Document 1 (Japanese Patent Laid-Open No. 6-109025) discloses a bearing where circumferential grooves are formed on an outer diameter surface of a bearing outer race, and a thermal expansion correction band, made of a synthetic resin, is fitted in the circumferential grooves. The bearing is assembled to a bearing stand of a crankcase.

In the bearing described in Patent Document 1, if a gap is formed between the bearing stand and the bearing outer race due to a difference in coefficient of linear expansion during the operation of an engine, the thermal expansion correction band fills the above-mentioned gap by thermal expansion of the thermal expansion correction band. Accordingly, the bearing is properly held so that fretting on fitting surfaces of the bearing stand and the bearing outer race is prevented.

However, in the bearing described in Patent Document 1, it is necessary to individually manufacture the bearing, which includes the bearing outer race, separately from the bearing stand of the crankcase as a matter of course. It is also necessary to manufacture the thermal expansion correction band as a separate part. Further, each member is required to have high dimensional accuracy and assembly accuracy. Accordingly, the bearing having the complicated structure prevents high productivity.

SUMMARY OF THE INVENTION

The present invention has been made in consideration of the above circumstances, and it is an object of the present invention to provide a bearing unit structure and a method for manufacturing the bearing unit structure which can properly ensure performance in holding a bearing member, and also can enhance productivity with a simple structure.

The above and other objects can be achieved according to the present invention by providing, in one aspect, a bearing unit structure including a bearing member and a bearing member holding unit. The bearing member rotatably supports a shaft. The bearing member holding unit is provided to a case member so as to hold the bearing member. A groove portion is formed on an inner peripheral surface of the bearing member holding unit, and the inner peripheral surface faces the bearing member. The thermal expansion correction member made of a resin is integrally formed with the bearing member holding unit in a state of being embedded into the groove portion.

The present invention of the above aspect may take following preferred embodiment.

The groove portion may be formed into a circumferential shape along the inner peripheral surface of the bearing member holding unit.

The groove portion may have a valley portion which is recessed from a bottom surface of the groove portion.

A plurality of the groove portions may be formed so as to be arranged in a row in an axial direction of the bearing member, and in this case, a coupling groove portion which connects the groove portions to each other may be provided.

The thermal expansion correction member may have a releasing groove portion at a center position in a width direction of the thermal expansion correction member.

Meanwhile, the above and other objects can be achieved according to the present invention by providing, in another aspect, a manufacturing method of a bearing unit structure which includes a bearing member rotatably supporting a shaft in a rotatable manner and a bearing member holding unit provided to a case member so as to hold the bearing member. The method includes: forming a groove portion on an inner peripheral surface of the bearing member holding unit, the inner peripheral surface facing the bearing member; injecting a resin into the groove portion so as to form a thermal expansion correction member made of a resin into an integral body with the bearing member holding unit in a state of being embedded into the groove portion; and performing processing on the inner peripheral surface of the bearing member holding unit and the thermal expansion correction member simultaneously thus forming a bearing member holding surface which comes into contact with the bearing member.

In an embodiment according to the aspect, the case member may be molded by casting, and the groove portion formed on the bearing member holding unit of the case member may be formed by using a casting mold for the case member.

According to the present invention, in the bearing unit structure, the thermal expansion correction member, which is interposed between the bearing member holding unit of the case member and the bearing member, thermally expands. Accordingly, the thermal expansion correction member fills a gap formed between the bearing member holding unit and the bearing member due to a difference in coefficient of linear expansion between both members so that correction is performed. Therefore, performance in holding a bearing member can be properly ensured. As a result, it is possible to prevent an occurrence of fretting between the bearing member holding unit and the bearing member.

In the bearing unit structure, the thermal expansion correction member is formed into an integral body with the bearing member holding unit of the case member. Accordingly, the bearing unit structure has a simple structure with the smaller number of parts. Further, facilities and man-hours for manufacturing the thermal expansion correction member as a separate part become unnecessary and hence, productivity can be enhanced.

The nature and further characteristic features of the present invention will be described hereinafter in the following descriptions made with reference to the accompanying drawings, and the other advantages effects and functions of the present invention will be also made clear hereinafter.

DETAILED DESCRIPTION

Hereinafter, embodiments for carrying out the present invention are described with reference to drawings.

Figure 1:
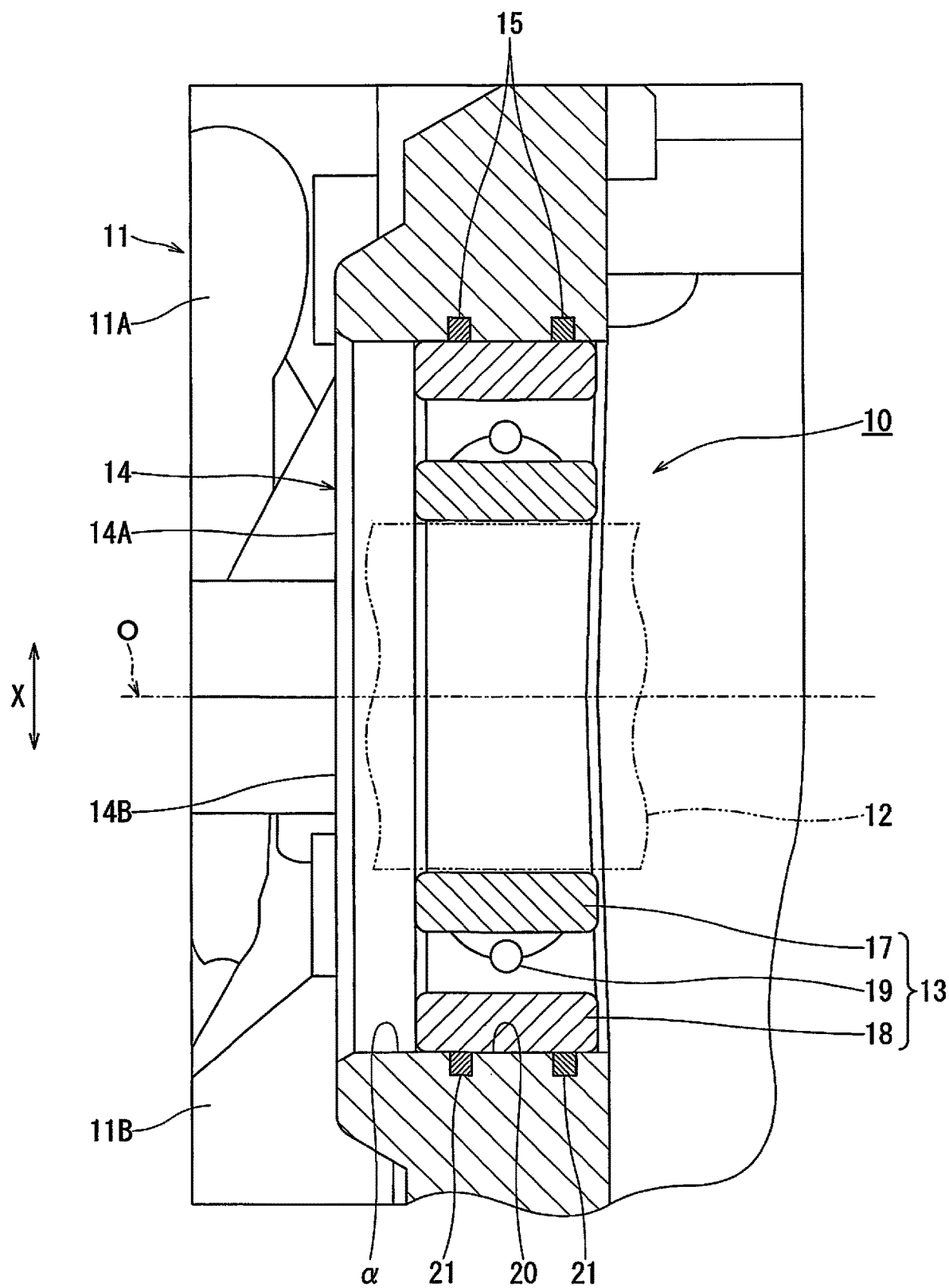
FIG. 1 is a partial cross-sectional view showing a crankcase and a bearing to which a bearing unit structure according to a first embodiment of the present invention is applied.
Figure 2:
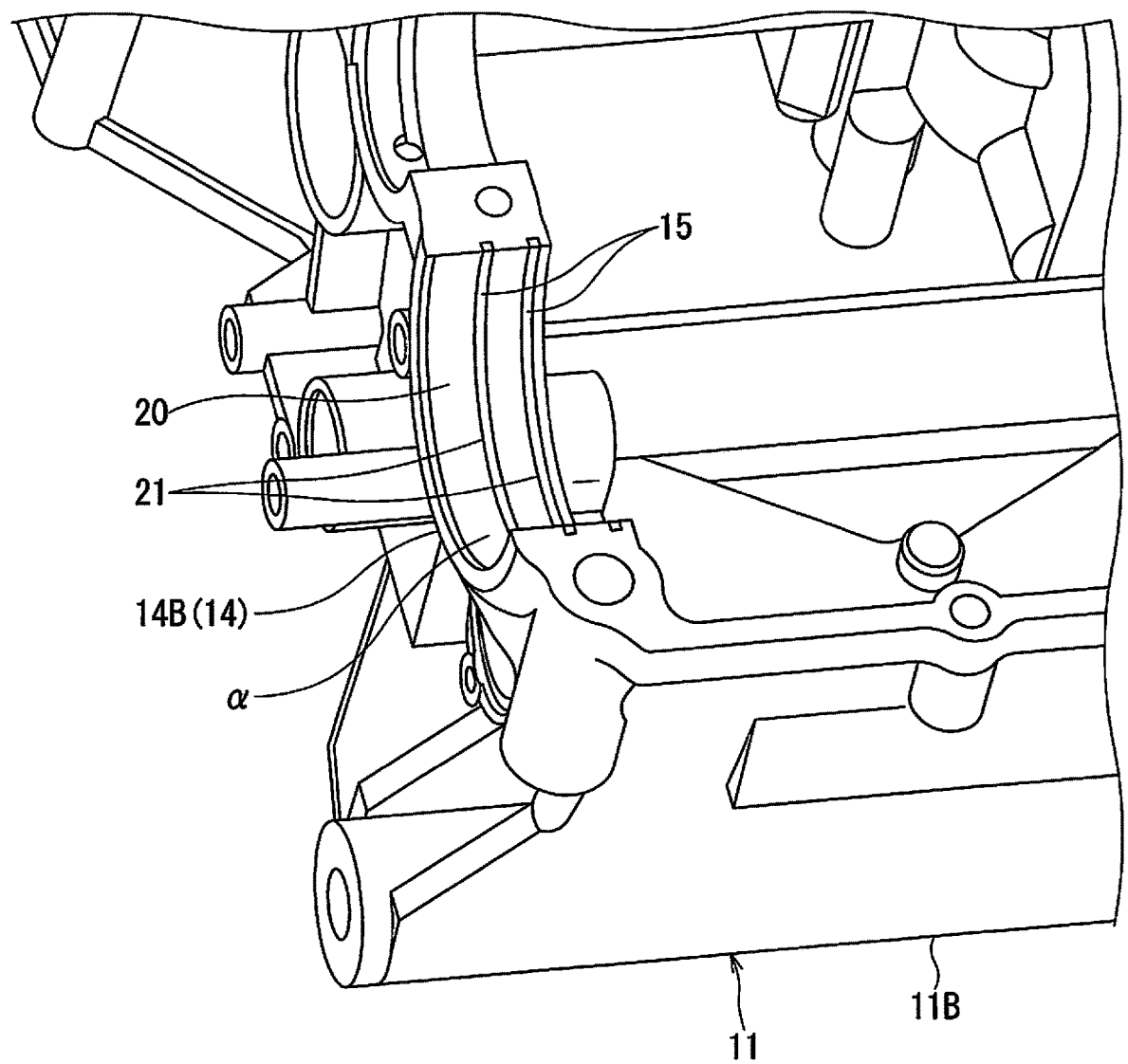
FIG. 2 is a partial perspective view showing a portion of a lower case shown in FIG. 1.
Figure 3:
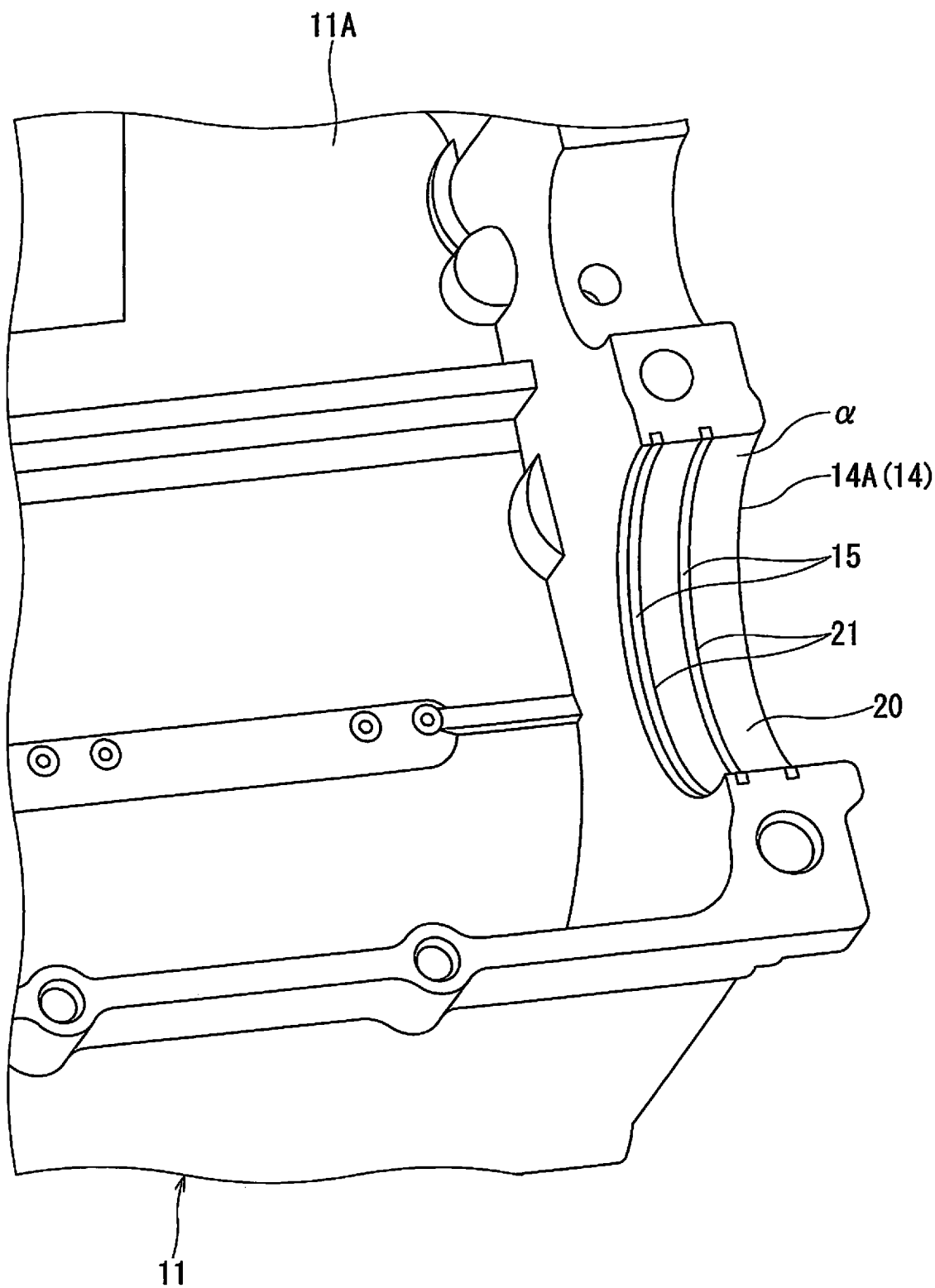
FIG. 3 is a partial perspective view showing a portion of an upper case shown in FIG. 1.

[A] First Embodiment (FIG. 1 to FIG. 3)

FIG. 1 is a partial cross-sectional view showing a crankcase and a bearing to which a bearing unit structure according to a first embodiment of the present invention is applied. A bearing unit structure 10 shown in FIG. 1 supports any of a variety of shafts (a drive shaft 12 in this embodiment) of a speed reduction mechanism provided in a crankcase 11, forming a case member of an engine, or a crankshaft not shown in the drawing. The bearing unit structure 10 includes: a bearing 13 forming a bearing member;

a bearing holding unit 14 forming a bearing member holding unit; and thermal expansion correction bands 15 each forming a thermal expansion correction member.

As shown in FIGS. 1 to 3, the crankcase 11 is formed by joining an upper case 11A and a lower case 11B which can be divided in a vertical direction, for example, using a center axis O of the bearing 13 as a boundary. The upper case 11A and the lower case 11B are respectively molded by casting using molds (dies, for example). An upper holding unit element 14A having a semi-cylindrical shape is formed on the upper case 11A. A lower holding unit element 14B having a semi-cylindrical shape is formed on the lower case 11B. When the upper case 11A and the lower case 11B are joined to each other so as to form the crankcase 11, the cylindrical bearing holding unit 14 which holds the bearing 13 is formed by the upper holding unit element 14A and the lower holding unit element 14B.

The bearing 13 is configured such that rolling elements 19 are arranged between an inner race 17 and an outer race 18. Fitting an outer peripheral surface of the outer race 18 onto a bearing holding surface 20 of the bearing holding unit 14 formed on the crankcase 11 allows the bearing 13 to be held by the bearing holding unit 14. The bearing holding surface 20 forms a bearing member holding surface. Further, fitting the drive shaft 12 onto an inner peripheral surface of the inner race 17 of the bearing 13 allows the bearing 13 to rotatably support the drive shaft 12.

The above-mentioned bearing holding surface 20 of the bearing holding unit 14 is formed by performing cutting processing on an inner peripheral surface α of the bearing holding unit 14, which faces the bearing 13. Before the cutting processing is performed, groove portions 21 are formed on the inner peripheral surface α in a circumferential shape along the inner peripheral surface α. The groove portions 21 may be formed by performing groove processing on the inner peripheral surface α of the bearing holding unit 14. In this embodiment, however, the groove portions 21 are formed by using respective molds which are used in molding the upper case 11A and the lower case 11B by casting.

A synthetic resin is injected into the groove portions 21 formed on the inner peripheral surface α of the bearing holding unit 14 so that the thermal expansion correction bands 15 made of a synthetic resin are integrally formed with the bearing holding unit 14 in a state of being embedded in the groove portions 21. Thereafter, the above-mentioned cutting processing is performed on the inner peripheral surface α of the bearing holding unit 14 and the thermal expansion correction bands 15 simultaneously. With such operations, the bearing holding surface 20 is formed. The bearing holding surface 20 comes into contact with the outer race 18 of the bearing 13, and has a uniform shape where the inner peripheral surface α and the thermal expansion correction bands 15 are coplanar with each other.

With the above-mentioned configuration, according to the first embodiment, the following advantageous effects (1) to (5) can be acquired.

(1) Assume a case where temperatures of the crankcase 11 and the bearing 13 increase due to an operation of an engine. The crankcase 11 is mainly made of an aluminum alloy, and the bearing 13 is mainly made of bearing steel. Accordingly, due to a difference in coefficient of linear expansion between the crankcase 11 and the bearing 13, a gap is formed between the bearing holding unit 14 formed on the crankcase 11 and the outer race 18 of the bearing 13 thus causing the outer race 18 of the bearing 13 to vibrate. In such a case, fretting may occur on the bearing holding surface 20 of the bearing holding unit 14 and on an outer peripheral surface of the outer race 18 of the bearing 13.

In such a case, in the bearing unit structure 10 of this embodiment, the thermal expansion correction bands 15 forming portions of the bearing holding surface 20 of the bearing holding unit 14 formed on the crankcase 11 are interposed between the bearing holding unit 14 and the outer race 18 of the bearing 13. Accordingly, during the operation of the engine, a temperature of the thermal expansion correction bands 15 increases so that the thermal expansion correction bands 15 thermally expand thus filling a gap formed between the bearing holding unit 14 and the outer race 18 so as to perform a correction. Therefore, performance of the bearing unit structure 10 in holding the bearing 13 is properly ensured and hence, vibration of the outer race 18 of the bearing 13 can be suppressed. As a result, it is possible to prevent fretting which occurs between the bearing holding surface 20 of the bearing holding unit 14 and the outer peripheral surface of the outer race 18 of the bearing 13.

(2) In the bearing unit structure 10, the thermal expansion correction bands 15 are formed into an integral body with the bearing holding unit 14 formed on the crankcase 11. Accordingly, the bearing unit structure 10 has a simple structure with the smaller number of parts. Further, facilities (a mold and the like, for example) and man-hours for manufacturing a thermal expansion correction band as a separate part are unnecessary. Accordingly, it is sufficient to have a simple facility, such as a resin injection nozzle, and hence, productivity of the bearing unit structure 10 can be enhanced.

(3) The thermal expansion correction bands 15 are formed into an integral body with the bearing holding unit 14 formed on the crankcase 11 and hence, it is possible to eliminate variation in dimensions between the bearing holding unit 14 and the thermal expansion correction bands 15. Further, the thermal expansion correction bands 15 are formed into an integral body with the bearing holding unit 14 in a state of being embedded into the groove portions 21 formed on the inner peripheral surface α of the bearing holding unit 14. Processing is performed on the thermal expansion correction bands 15 simultaneously with the inner peripheral surface α of the bearing holding unit 14 so that the thermal expansion correction bands 15 form the bearing holding surface 20 together with the inner peripheral surface α. The bearing holding surface 20 has a uniform shape where the inner peripheral surface α and the thermal expansion correction bands 15 are coplanar with each other. As a result, the bearing unit structure 10 can stably perform, using the thermal expansion correction bands 15, correction on a gap formed due to a difference in coefficient of linear expansion between the bearing holding unit 14 and the bearing 13.

(4) The thermal expansion correction bands 15 are formed into an integral body with the bearing holding unit 14 formed on the crankcase 11 and hence, it is possible to eliminate variation in dimension between the bearing holding unit 14 and the thermal expansion correction band 15. Further, the thermal expansion correction bands 15 are formed into an integral body with the bearing holding unit 14 in a state of being embedded into the groove portions 21 formed on the inner peripheral surface α of the bearing holding unit 14. Processing is performed on the thermal expansion correction bands 15 simultaneously with the inner peripheral surface α of the bearing holding unit 14 so that the thermal expansion correction bands 15 form the bearing holding surface 20 together with the inner peripheral surface α. The bearing holding surface 20 has a uniform shape where the inner peripheral surface α and the thermal expansion correction bands 15 are coplanar with each other. Accordingly, dimensional accuracy of an inner diameter of the thermal expansion correction bands 15 is unnecessary before processing is performed. As a result, it is unnecessary to control dimensional accuracy and assembly accuracy of the thermal expansion correction bands 15 and hence, an accuracy control of the bearing unit structure 10 is facilitated whereby productivity can be enhanced.

(5) The groove portions 21 of the bearing holding unit 14 formed on the crankcase 11 are formed at the time of forming the upper case 11A and the lower case 11B by casting by molds which are used in molding the upper case 11A and the lower case 11B of the crankcase 11 respectively by casting. Accordingly, it is possible to eliminate a processing step where the groove portions 21 are processed after the upper case 11A and the lower case 11B are molded. Further, the groove portions 21 having a desired depth can be formed by using the above-mentioned molds. Therefore, also from such a viewpoint, productivity of the bearing unit structure 10 can be enhanced.

Figure 4:
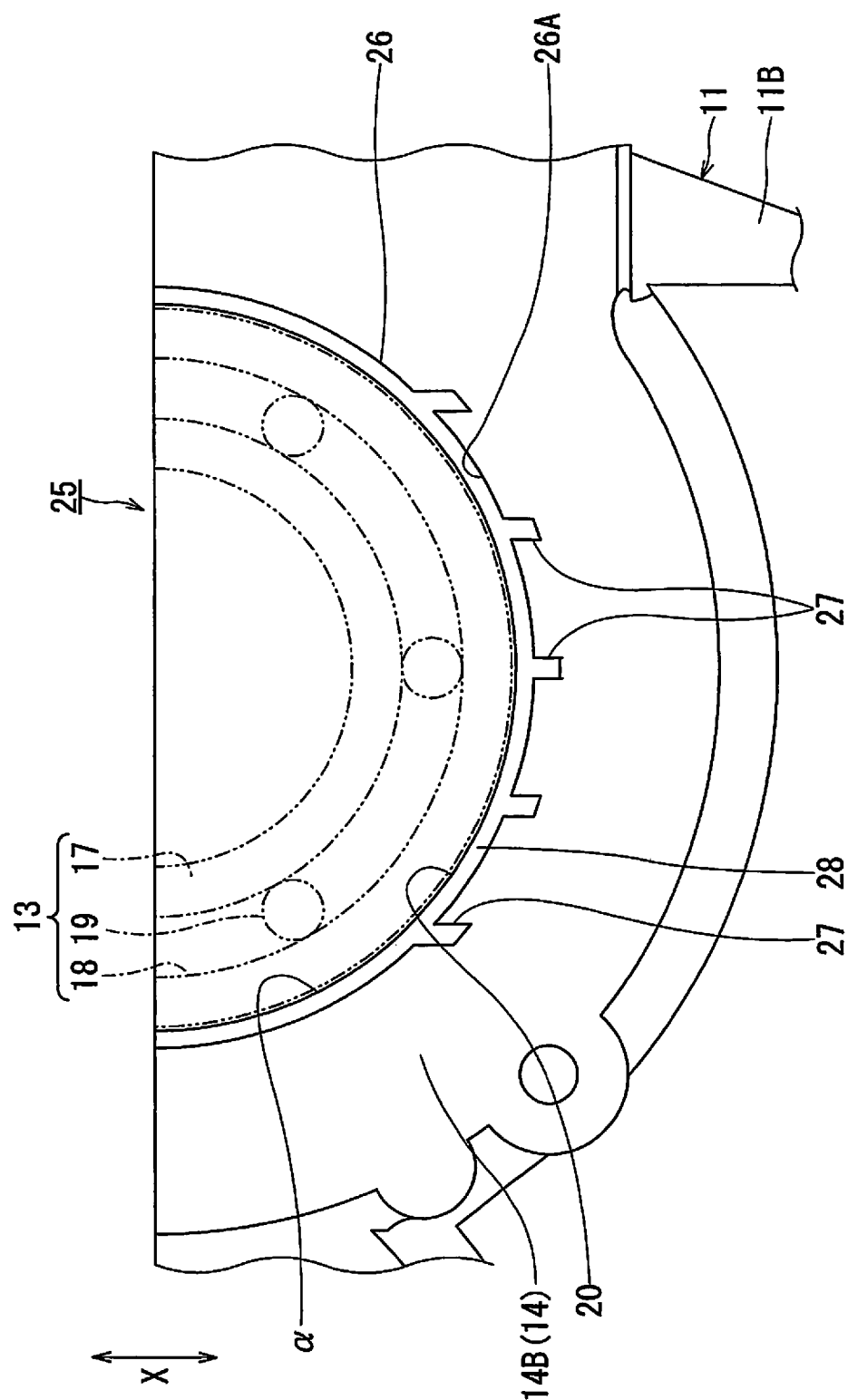
FIG. 4 is a partial side view showing a portion of a lower case to which a bearing unit structure according to a second embodiment of the present invention is applied.

[B] Second Embodiment (FIG. 4)

FIG. 4 is a partial side view showing a portion of a lower case to which a bearing unit structure according to a second embodiment of the present invention is applied. In the second embodiment, parts substantially equal to the corresponding parts in the first embodiment are given the same reference characters as the first embodiment, and repeated description is simplified or omitted.

Points which make a bearing unit structure 25 of the second embodiment different from a bearing unit structure of the first embodiment are as follows. A groove portion 26 is formed on an inner peripheral surface α of a bearing holding unit 14 formed on a crankcase 11, and the groove portion 26 has valley portions 27 on a bottom surface 26A of the groove portion 26. The valley portions 27 are further recessed from the bottom surface 26A of the groove portion 26.

The plurality of the valley portions 27 are provided at substantially equal intervals along the bottom surface 26A of the groove portion 26. Each of the valley portions 27 is formed into a shape which is recessed in a direction X along which an upper case 11A and a lower case 11B of the crankcase 11 are divided. Accordingly, the valley portions 27 can be formed by using molds for molding the upper case 11A and the lower case 11B by casting.

With the above-mentioned configuration, the second embodiment can acquire the following advantageous effect (6) in addition to advantageous effects substantially equal to the advantageous effects (1) to (5) acquired in the first embodiment.

(6) The groove portion 26 formed on the inner peripheral surface α of the bearing holding unit 14 formed on the crankcase 11 has the valley portions 27 which are further recessed from the bottom surface 26A of the groove portion 26. Causing a synthetic resin to be injected into the groove portion 26 and the valley portions 27 allows a thermal expansion correction band 28, forming a thermal expansion correction member, to be formed into an integral body with the bearing holding unit 14. With such a configuration, the thermal expansion correction band 28 is firmly adhered to the bearing holding unit 14. Accordingly, the thermal expansion correction band 28 is prevented from easily peeling away from the groove portion 26 and the valley portions 27. Therefore, in forming the bearing holding surface 20 by performing processing on the inner peripheral surface α of the bearing holding unit 14 simultaneously with the thermal expansion correction band 28, the processing can be facilitated.

Figure 5:
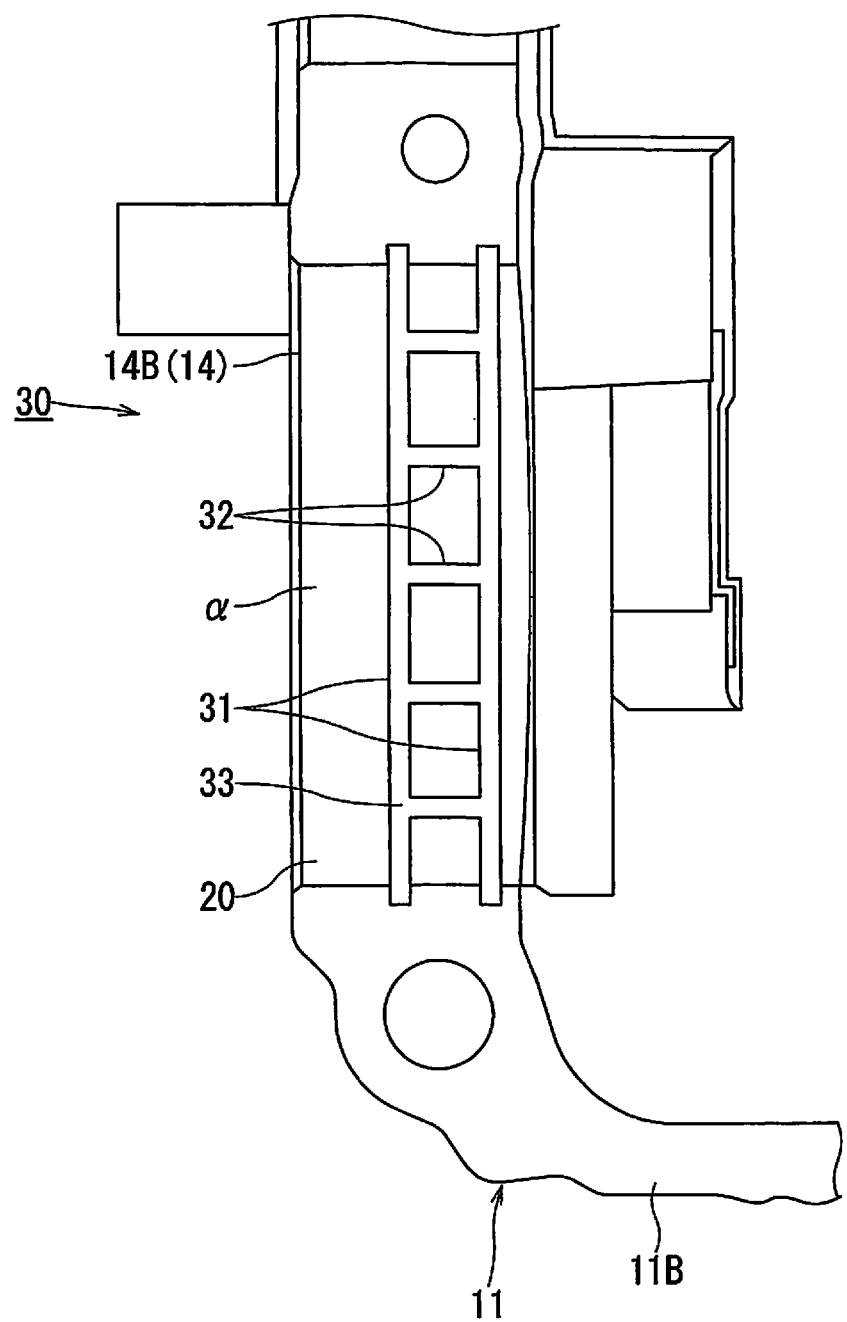
FIG. 5 is a partial plan view showing a portion of a lower case to which a bearing unit structure according to a third embodiment of the present invention is applied.

[C] Third Embodiment (FIG. 5)

FIG. 5 is a partial plan view showing a portion of a lower case to which a bearing unit structure according to a third embodiment of the present invention is applied. In the third embodiment, parts substantially equal to the corresponding parts in the first embodiment are given the same reference characters as the first embodiment, and repeated description is simplified or omitted.

Points which make a bearing unit structure 30 of the third embodiment different from a bearing unit structure of the first embodiment are as follows. A plurality of (two, for example) groove portions 31 are formed on an inner peripheral surface α of a bearing holding unit 14 formed on a crankcase 11 such that the groove portions 31 are arranged in a row in a direction of the center axis O of the bearing 13 (see FIG. 1). A plurality of coupling groove portions 32 which connect the groove portions 31 to each other are also formed on the inner peripheral surface α. Accordingly, the groove portions 31 and the coupling groove portions 32 are formed into a ladder shape. It is preferable that the groove portions 31 and the coupling groove portions 32 be also molded with respective casting molds for the upper case 11A and the lower case 11B.

With the above-mentioned configuration, the third embodiment can acquire the following advantageous effect (7) in addition to advantageous effects substantially equal to the advantageous effects (1) to (5) acquired in the first embodiment.

(7) The plurality of the groove portions 31 are formed on the inner peripheral surface α of the bearing holding unit 14 formed on the crankcase 11 such that the groove portions 31 are arranged in a row in the direction of the center axis O of the bearing 13. These groove portions 31 are coupled to each other by the coupling groove portions 32. Causing a synthetic resin to be injected into the groove portions 31 and the coupling groove portions 32 allows a thermal expansion correction band 33, forming a thermal expansion correction member, to be formed into an integral body with the bearing holding unit 14. With such a configuration, the thermal expansion correction band 33 is firmly adhered to the bearing holding unit 14. Accordingly, the thermal expansion correction band 33 is prevented from easily peeling away from the groove portions 31 and the coupling groove portions 32. Therefore, in forming a bearing holding surface 20 by performing processing on the inner peripheral surface α of the bearing holding unit 14 simultaneously with the thermal expansion correction band 33, the processing can be facilitated.

Figure 6:
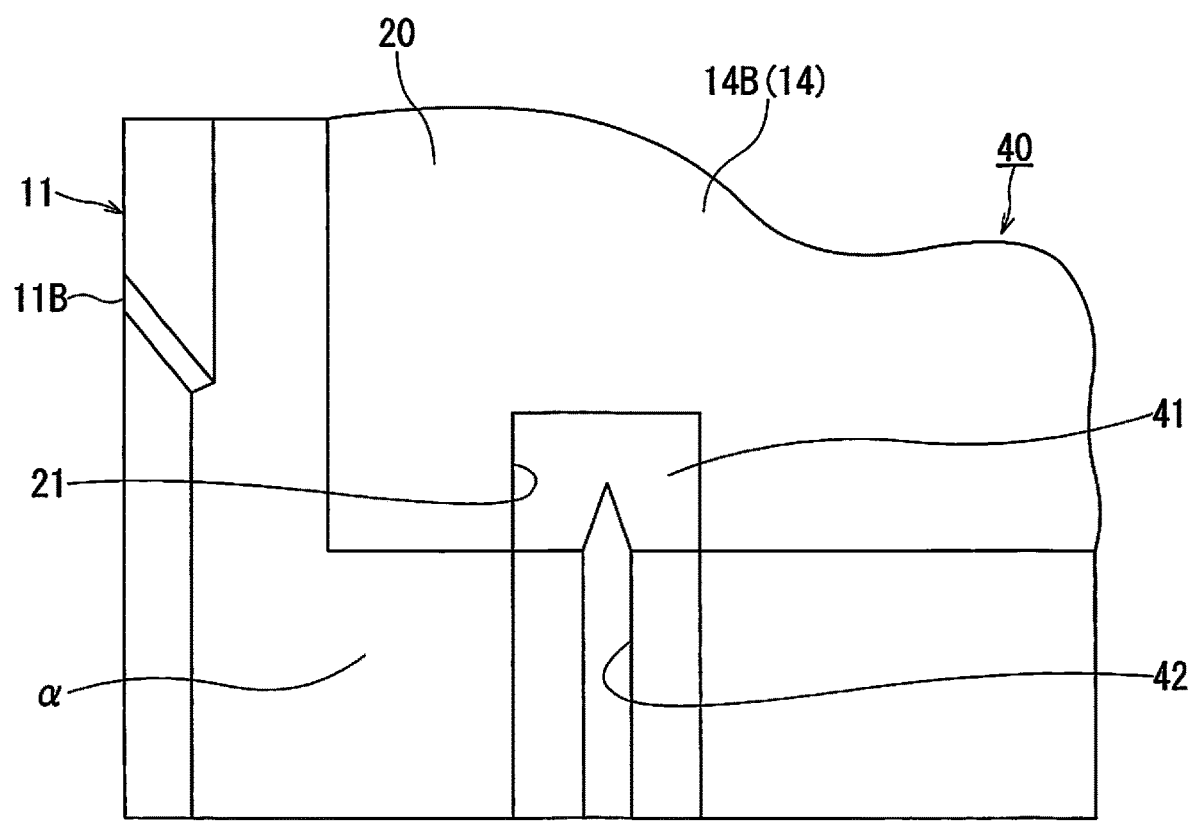
FIG. 6 is a partial plan view showing a portion of a lower case to which a bearing unit structure according to a fourth embodiment of the present invention is applied.

[D] Fourth Embodiment (FIG. 6)

FIG. 6 is a partial plan view showing a portion of a lower case to which a bearing unit structure according to a fourth embodiment of the present invention is applied. In the fourth embodiment, parts substantially equal to the corresponding parts in the first embodiment are given the same reference characters as the first embodiment, and repeated description is simplified or omitted.

Points which make a bearing unit structure 40 of the fourth embodiment different from a bearing unit structure of the first embodiment are as follows. A thermal expansion correction band 41, forming a thermal expansion correction member, is formed into an integral body with a bearing holding unit 14 in a state of being embedded into a groove portion 21 of the bearing holding unit 14 formed on a crankcase 11. The thermal expansion correction band 41 has a releasing groove portion 42 at a center position in a width direction (a direction of the center axis O of the bearing 13) of the thermal expansion correction band 41.

The releasing groove portion 42 is formed on a surface of the thermal expansion correction band 41 after a bearing holding surface 20 is formed by performing processing on an inner peripheral surface α of the bearing holding unit 14 simultaneously with the thermal expansion correction band 41. The releasing groove portion 42 is formed over the whole circumference of the thermal expansion correction band 41 or suitable intervals in a circumferential direction of the thermal expansion correction band 41.

With the above-mentioned configuration, the fourth embodiment can acquire the following advantageous effect (8) in addition to advantageous effects substantially equal to the advantageous effects (1) to (5) acquired in the first embodiment.

(8) When a temperature of the crankcase 11 increases, the thermal expansion correction band 41 may excessively thermally expands to an extent greater than that the thermal expansion correction band 41 fills a gap formed between the bearing holding surface 20 of the bearing holding unit 14 and an outer peripheral surface of an outer race 18 of the bearing 13. Also in such a case, the releasing groove portion 42 is formed on the surface of the thermal expansion correction band 41, which is embedded into the groove portion 21 of the bearing holding unit 14 formed on the crankcase 11, and hence, the deformation of the thermal expansion correction band 41 caused by the above-mentioned excessive thermal expansion can be released to the releasing groove portion 42. Accordingly, damage of the thermal expansion correction band 41 under thermal expansion can be reliably prevented.

The embodiments of the present invention have been described heretofore. However, the embodiments are merely given for the sake of example, and do not intend to limit the scope of the invention. The embodiments can be carried out in other various modes, and various omissions, replacements, and changes may be made thereto without departing from the gist of the invention. The accompanying claims and their equivalents are intended to cover such forms or modifications as would fall within the scope and spirit of the inventions.

For example, in the embodiments, the description has been made with respect to a case where the bearing unit structure of the present invention is applied to an engine. However, the bearing unit structure of the present invention may be applied to any various machines such as a machine tool.

What is claimed is:
1. A bearing unit structure comprising:
   a bearing member rotatably supporting a shaft; and
   a bearing member holding unit provided to a case member so as to hold the bearing member, wherein
   at least one groove portion is formed on an inner peripheral surface of the bearing member holding unit, the inner peripheral surface facing the bearing member,
   a thermal expansion correction member made of a resin is integrally formed with the bearing member holding unit in a state of being embedded into the at least one groove portion and
   a bearing member holding surface having a uniform shape and coming into contact with an outer race of the bearing member is formed on the inner peripheral surface of the bearing member holding unit and the thermal expansion correction member such that the inner peripheral surface and the thermal expansion correction member are coplanar with each other.

2. The bearing unit structure according to claim 1, wherein the at least one groove portion is formed into a circumferential shape along the inner peripheral surface of the bearing member holding unit.

3. The bearing unit structure according to claim 1, wherein the at least one groove portion has a valley portion which is recessed from a bottom surface of the at least one groove portion.

4. The bearing unit structure according to claim 1, wherein
   the at least one groove portion comprises a plurality of groove portions,
   the plurality of groove portions are formed so as to be arranged in a row in an axial direction of the bearing member, and
   a coupling groove portion which connects the groove portions to each other is provided.

5. The bearing unit structure according to claim 1, wherein the thermal expansion correction member has a releasing groove portion at a center position in a width direction of the thermal expansion correction member.

6. A manufacturing method of the bearing unit structure recited in claim 1, the method comprising:
   forming the at least one groove portion on then inner peripheral surface of the bearing member holding unit, the inner peripheral surface facing the bearing member;
   injecting the resin into the at least one groove portion so as to integrally form the thermal expansion correction member made of the resin with the bearing member holding unit in a state of being embedded into the at least one groove portion; and performing processing on the inner peripheral surface of the bearing member holding unit and the thermal expansion correction member simultaneously so as to form the bearing member holding surface which has a uniform shape and comes into contact with the outer race of the bearing member thereby the inner peripheral surface and the thermal expansion correction member are coplanar with each other.

7. The manufacturing method of the bearing unit structure according to claim 6, wherein the case member is molded by casting, and the at least one groove portion formed on the bearing member holding unit of the case member is formed by using a casting mold for the case member.

8. The bearing unit structure according to claim 1, wherein the at least one groove portion is formed into a circumferential shape along the inner peripheral surface of the bearing member holding unit.

9. A bearing unit structure comprising:
 a bearing member rotatably supporting a shaft; and
 a bearing member holding unit provided to a case member so as to hold the bearing member, wherein
 a plurality of groove portions are formed on an inner peripheral surface of the bearing member holding unit, the inner peripheral surface facing the bearing member,
 a thermal expansion correction member made of a resin is integrally formed with the bearing member holding unit in a state of being embedded into the plurality of the groove portions,
 the plurality of the groove portions are formed so as to be arranged in a row in an axial direction of the bearing member, and
 a coupling groove portion which connects the groove portions to each other is provided.

10. The bearing unit structure according to claim 9, wherein the plurality of the groove portions are formed into a circumferential shape along the inner peripheral surface of the bearing member holding unit.

11. A manufacturing method of the bearing unit structure recited in claim 9, the method comprising:
 forming the plurality of the groove portions on then inner peripheral surface of the bearing member holding unit, the inner peripheral surface facing the bearing member;
 injecting the resin into the plurality of the groove portions so as to integrally form the thermal expansion correction member made of the resin with the bearing member holding unit in a state of being embedded into the plurality of the groove portions; and
 performing processing on the inner peripheral surface of the bearing member holding unit and the thermal expansion correction member simultaneously so as to form the bearing member holding surface which comes into contact with the bearing member.

12. The manufacturing method of the bearing unit structure according to claim 11, wherein the case member is molded by casting, and the plurality of the groove portions formed on the bearing member holding unit of the case member is formed by using a casting mold for the case member.

13. A bearing unit structure comprising:
 a bearing member rotatably supporting a shaft; and
 a bearing member holding unit provided to a case member so as to hold the bearing member, wherein
 at least one groove portion is formed on an inner peripheral surface of the bearing member holding unit, the inner peripheral surface facing the bearing member,
 a thermal expansion correction member made of a resin is integrally formed with the bearing member holding unit in a state of being embedded into the at least one groove portion, and
 the thermal expansion correction member has a releasing groove portion at a center position in a width direction of the thermal expansion correction member.

14. A manufacturing method of the bearing unit structure recited in claim 13, the method comprising:
 forming the at least one groove portion on then inner peripheral surface of the bearing member holding unit, the inner peripheral surface facing the bearing member;
 injecting the resin into the at least one groove portion so as to integrally form the thermal expansion correction member made of the resin with the bearing member holding unit in a state of being embedded into the at least one groove portion; and
 performing processing on the inner peripheral surface of the bearing member holding unit and the thermal expansion correction member simultaneously so as to form the bearing member holding surface which comes into contact with the bearing member.

15. The manufacturing method of the bearing unit structure according to claim 14, wherein the case member is molded by casting, and the at least one groove portion formed on the bearing member holding unit of the case member is formed by using a casting mold for the case member.

\* \* \* \* \*